US012260628B2

(12) United States Patent
Zeng et al.

(10) Patent No.: US 12,260,628 B2
(45) Date of Patent: Mar. 25, 2025

(54) FEATURE EXTRACTION OF MULTIMEDIA DATA

(71) Applicant: Lemon Inc., Grand Cayman (KY)

(72) Inventors: Xiangyu Zeng, Los Angeles, CA (US); Hongyu Xiong, Los Angeles, CA (US); Yiqi Feng, Los Angeles, CA (US); Han Wang, Los Angeles, CA (US); Yuan Gao, Los Angeles, CA (US); Qingyi Lu, Los Angeles, CA (US); Rui Li, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 401 days.

(21) Appl. No.: 17/724,140

(22) Filed: Apr. 19, 2022

(65) Prior Publication Data

US 2023/0334839 A1 Oct. 19, 2023

(51) Int. Cl.
G06V 10/80 (2022.01)
G06V 10/22 (2022.01)
G06V 10/40 (2022.01)
G06V 20/40 (2022.01)
G06V 20/62 (2022.01)
(Continued)

(52) U.S. Cl.
CPC .......... G06V 10/806 (2022.01); G06V 10/225 (2022.01); G06V 10/40 (2022.01); G06V 30/1448 (2022.01); G10L 15/26 (2013.01)

(58) Field of Classification Search
CPC .............. G06V 10/806; G06V 10/225; G06V 30/1448; G06V 10/82; G06V 20/46; G06V 20/635; G10L 15/26
See application file for complete search history.

(56) References Cited

U.S. PATENT DOCUMENTS 9,501,708 B1 * 11/2016 Ahmad ................ G06V 30/245
9,633,015 B2 * 4/2017 Arngren ................ G06F 16/22
(Continued)

FOREIGN PATENT DOCUMENTS

CN 113011320 A 6/2021
CN 113392232 A 9/2021
(Continued)

OTHER PUBLICATIONS

International Search Report in PCT/SG2023/050259, mailed Oct. 12, 2023, 3 pages.

Primary Examiner — Siamak Harandi
Assistant Examiner — Andrew S Budisalich
(74) Attorney, Agent, or Firm — Astute IP Law Group

(57) ABSTRACT

Implementations of the present disclosure relate to methods, devices, and computer program products of extracting a feature for multimedia data that comprises a plurality of medium types. In a method, a first feature is determined for a first medium type in the plurality of medium types by masking a portion in a first medium object with the first medium type. A second feature is determined for a second medium type other than the first medium type in the plurality of medium types. The feature is generated for the multimedia data based on the first and second features. With these implementations, multiple medium types are considered in the feature extraction, and thus the feature may fully reflect various aspects of the multimedia data in an accurate way.

20 Claims, 12 Drawing Sheets

(51) Int. Cl.
*G06V 30/14* (2022.01)
*G10L 15/26* (2006.01)

(56) References Cited

U.S. PATENT DOCUMENTS

| | | | | |
|---|---|---|---|---|
| 2004/0006737 | A1* | 1/2004 | Colbath | G10L 15/26 715/201 |
| 2008/0059198 | A1* | 3/2008 | Maislos | G06F 16/9535 707/E17.109 |
| 2011/0158533 | A1* | 6/2011 | Gutelzon | G06T 3/4046 382/176 |
| 2014/0198031 | A1* | 7/2014 | Xiong | G06V 40/113 382/103 |
| 2015/0317804 | A1* | 11/2015 | Wang | G06T 7/90 382/164 |
| 2022/0375190 | A1 | 11/2022 | Chae et al. | |

FOREIGN PATENT DOCUMENTS

| | | |
|---|---|---|
| CN | 113449070 A | 9/2021 |
| CN | 113705315 A | 11/2021 |
| KR | 20220026313 A | 3/2022 |

\* cited by examiner

FEATURE EXTRACTION OF MULTIMEDIA DATA

FIELD

The present disclosure generally relates to feature extraction, and more specifically, to methods, devices, and computer program products for extracting a feature from multimedia data.

BACKGROUND

Nowadays, the machine learning technique has been widely used in data processing. For example, in a field of data recommendation, the data may involve multiple medium types such as texts, images, audios and so on. There have been proposed solutions for extracting a feature from data with a single type (such as the text data or the image data), however, these solutions cannot process the multimedia data effectively. At this point, how to extract a feature from the multimedia data becomes a hot focus.

SUMMARY

In a first aspect of the present disclosure, there is provided a method of extracting a feature for multimedia data that comprises a plurality of medium types. In a method, a first feature is determined for a first medium type in the plurality of medium types by masking a portion in a first medium object with the first medium type. A second feature is determined for a second medium type other than the first medium type in the plurality of medium types. The feature is generated for the multimedia data based on the first and second features.

In a second aspect of the present disclosure, there is provided an electronic device. The electronic device comprises: a computer processor coupled to a computer-readable memory unit, the memory unit comprising instructions that when executed by the computer processor implements a method according to the first aspect of the present disclosure.

In a third aspect of the present disclosure, there is provided a computer program product, the computer program product comprising a computer readable storage medium having program instructions embodied therewith, the program instructions executable by an electronic device to cause the electronic device to perform a method according to the first aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE SEVERAL VIEWS OF THE DRAWINGS

Through the more detailed description of some implementations of the present disclosure in the accompanying drawings, the above and other objects, features and advantages of the present disclosure will become more apparent, wherein the same reference generally refers to the same components in the implementations of the present disclosure.

DETAILED DESCRIPTION

Figure 1:
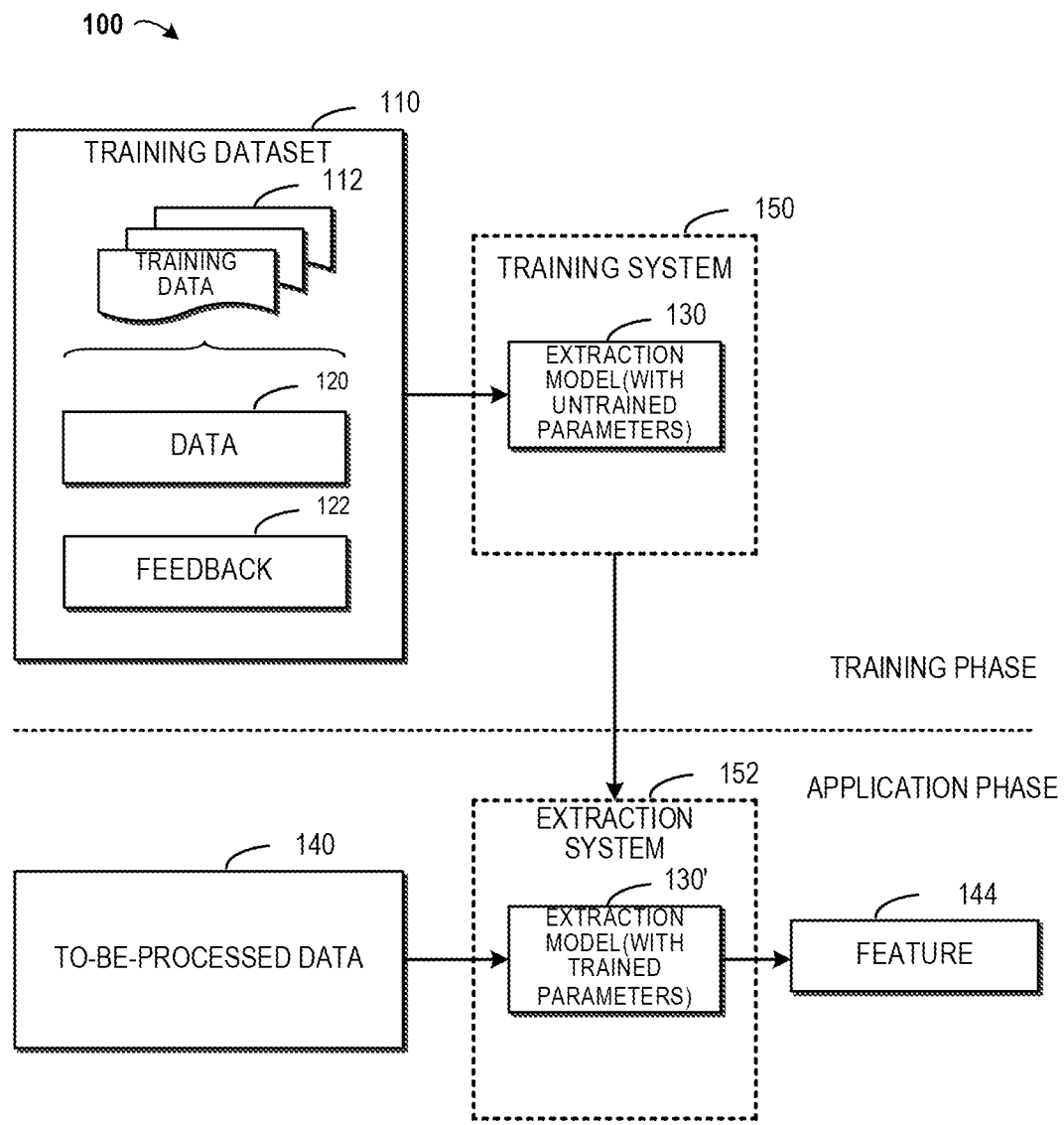
FIG. 1 illustrates an example environment for extracting a feature according to the machine learning technique.

Principle of the present disclosure will now be described with reference to some implementations. It is to be understood that these implementations are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one implementation," "an implementation," "an example implementation," and the like indicate that the implementation described may include a particular feature, structure, or characteristic, but it is not necessary that every implementation includes the particular feature, structure, or characteristic. Moreover, such phrases are not necessarily referring to the same implementation. Further, when a particular feature, structure, or characteristic is described in connection with an example implementation, it is submitted that it is within the knowledge of one skilled in the art to affect such feature, structure, or characteristic in connection with other implementations whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example implementations. As used herein, the term "and/or" includes any and all combinations of one or more of the listed terms.

The terminology used herein is for the purpose of describing particular implementations only and is not intended to be limiting of example implementations. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

It is to be understood that items involved in the present disclosure should be notified to users and user authorizations should be obtained in an appropriate manner according to relevant laws and regulations before the technical solutions disclosed in implementations of the present disclosure are applied. The items include a type of personal information, application range, and application scenario, and so on.

Principle of the present disclosure will now be described with reference to some implementations. It is to be understood that these implementations are described only for the purpose of illustration and help those skilled in the art to understand and implement the present disclosure, without suggesting any limitation as to the scope of the disclosure. The disclosure described herein can be implemented in various manners other than the ones described below. In the following description and claims, unless defined otherwise, all technical and scientific terms used herein have the same meaning as commonly understood by one of ordinary skills in the art to which this disclosure belongs.

For the purpose of description, the following paragraphs will provide more details by taking a recommendation environment as an example. In the recommendation environment, various data may be displayed to a user. Sometimes, the user is interested in some of them and then provides the positive feedback (such as the "like" action). If the user is not interested in some data, he/she provides negative feedbacks (such as the "dislike" action). Here, sensitive information should be removed from the feedbacks and/or other user information. With respect to the displayed data with a single type, the machine learning technique may extract features (such as embeddings) for a specific purpose. Hereinafter, reference will be made to FIG. 1 for more details about the feature extraction, here FIG. 1 illustrates an example environment 100 for extracting a feature according to the machine learning technique.

In FIG. 1, an extraction model 130 may be provided for the feature extraction. Here, the environment 100 includes a training system 150 and an extraction system 152. The upper portion of FIG. 1 shows a training phase, and the lower portion shows an application phase. Before the training phase, the extraction model 130 may be configured with untrained or partly trained parameters (such as initial parameters, or pre-trained parameters). In the training phase, the extraction model 130 may be trained in the training system 150 based on a training dataset 110 including a plurality of training data 112. Here, each training data 112 may have a two-tuple format, and may include data 120 (for example, data that is displayed to the user) and the user feedback 122. Specifically, a large amount of training data 112 may be used to perform the training phase iteratively. After the training phase, the parameters of the extraction model 130 may be updated and optimized, and an extraction model 130' with trained parameters may be obtained. At this point, the extraction model 130' may be used to implement the extraction task in the application phase. For example, the to-be-processed data 140 may be inputted into the extraction system 152, and then a corresponding feature 144 may be extracted.

In FIG. 1, the model training system 150 and the model application system 152 may include any computing system with computing capabilities, such as various computing devices/systems, terminal devices, servers, and so on. The terminal device may involve any type of mobile device, fixed terminal or portable device, including mobile phones, desktop computers, laptop computers, notebook computers, netbook computers, tablet computers, media computers, multimedia tablets, or any combination of the foregoing, including the accessories and peripherals of these devices or any combination thereof. Servers may include but are not limited to mainframes, edge computing nodes, computing devices in cloud environments, and so on. It should be understood that the components and arrangements in the environment 100 in FIG. 1 are only examples, and a computing system suitable for implementing the example implementation described in the present disclosure may include one or more different components, and other components. For example, the training system 150 and the extraction system 152 may be integrated in the same system or device.

As illustrated in FIG. 1, solutions have been proposed for extracting features for a single medium type. However, with the enrichment of various data types, multimedia data that involves multiple medium types have become popular. Therefore, the existing feature extraction solutions cannot process the multimedia data effectively and the extracted features cannot fully reflect various aspects of the multimedia data.

Figure 2:
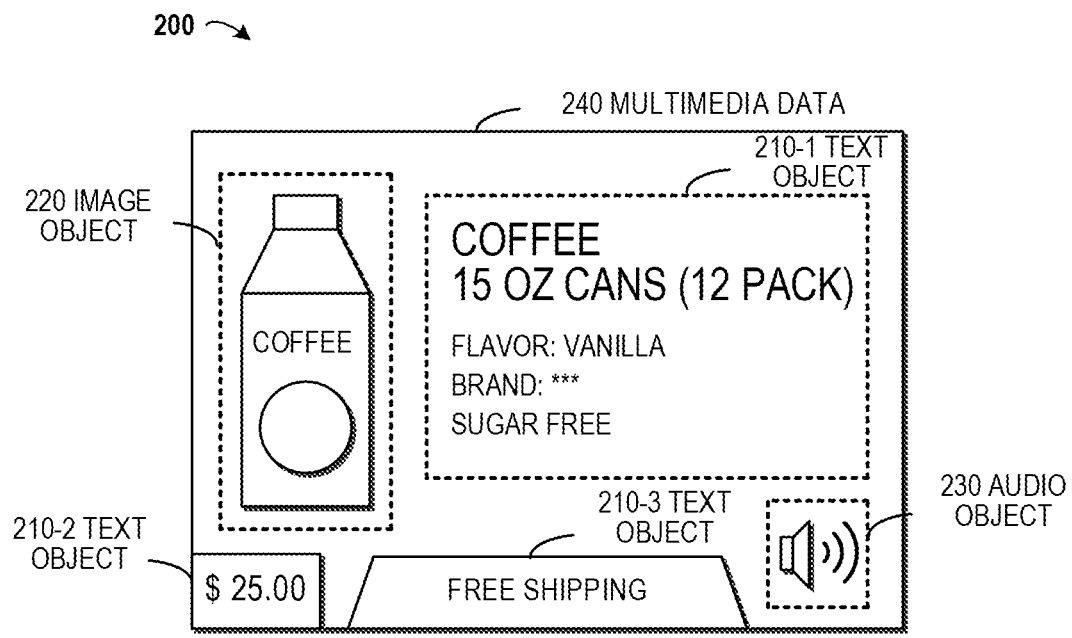
FIG. 2 illustrates an example diagram of multimedia data that may be processed according to implementations of the present disclosure.

In view of the above, the present disclosure proposes a feature extraction solution. In the proposed solution, a multimedia feature may be extracted from the multimedia data, and various medium types comprised in the multimedia data may be considered in the extraction procedure. Reference will be made to FIG. 2 for more details about the multimedia data, here FIG. 2 illustrates an example diagram 200 of multimedia data that may be processed according to implementations of the present disclosure. As illustrated in FIG. 2, the multimedia data 240 may include multiple medium types such as the text type, the image type, the audio type, and so on. Specifically, with respect to a specific medium type, there may be one or more medium objects. For example, the multimedia data 240 may include three text objects with the text type: a text object 210-1, a text object 210-2, and a text object 210-3 (collectively referred to as the text object 210). Further, the multimedia data 240 may include an image object 220 with the image type and an audio object 230 with the audio type. With implementations of the present disclosure, respective medium types may be processed in the extraction procedure, and thus the extracted feature may include accurate characteristic information about the multimedia data 240.

Figure 3:
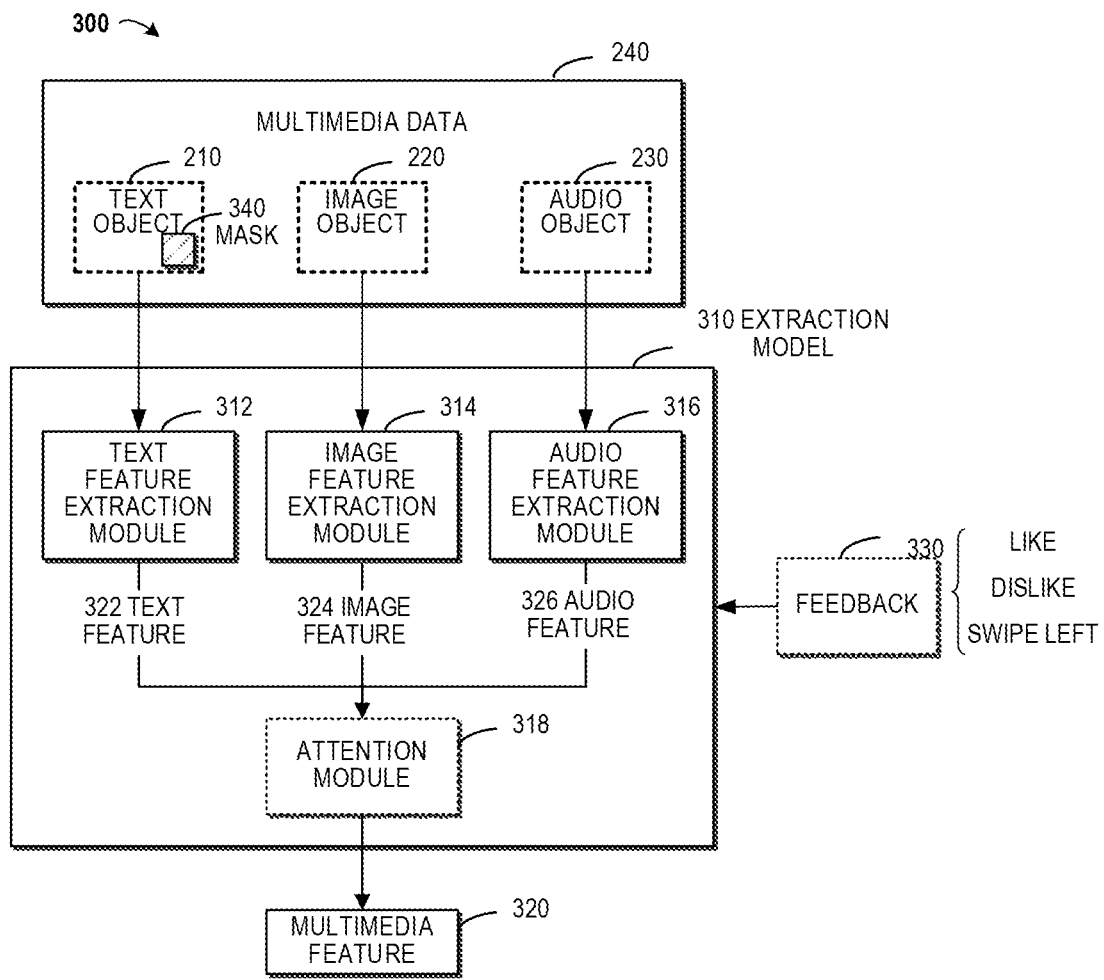
FIG. 3 illustrates an example diagram for extracting a feature from the multimedia data according to implementations of the present disclosure.

Referring to FIG. 3 for a brief description of implementations of the present disclosure. FIG. 3 illustrates an example diagram 300 for extracting a feature from the multimedia data according to implementations of the present disclosure. In FIG. 3, medium objects with different types may be processed in the extraction procedure. Specifically, a first medium type (such as the text type) and a second medium type (such as any of the image type and the audio type) may be selected from a plurality of medium types that are comprised in the multimedia data 240. Here, the first and second medium types should be different.

As illustrated in FIG. 3, an extraction model 310 may be used for processing the multiple medium types and extracting a multimedia feature 320 from the multimedia data 240. In implementations of the present disclosure, the extraction model 310 may comprise respective modules for processing respective medium types. Here, each module may describe an association relationship between a feature and a medium object for a specific medium type. For example, a text feature extraction module 312 may describe an association relationship between the text feature and the text object, an image feature extraction module 314 may describe an association relationship between the image feature and the image object, and an audio feature extraction module 316 may describe an association relationship between the audio feature and the audio object.

Here, the above extraction modules may be implemented by pre-trained machine learning models based on the historical training data by minimizing the loss. It is to be understood that data (including but not limited to the data itself, the obtaining or using of the data) involved in the present disclosure should comply with corresponding laws, regulations and related requirements. Here, the historical training data may comprise the multimedia data that was displayed to the user and the feedback 330 from the user showing whether the user liked the multimedia data. For example, a "like" action indicates that the user liked the multimedia data, a "dislike" action indicates that the user did not like the multimedia data, and a swipe left action also indicates that the user was interested in the multimedia data and wanted to learn more information. It is to be understood that sensitive information should be removed from the training data. For example, user information and/or the feedback should be converted into embeddings and become invisible. In implementations of the present disclosure, the above extraction modules may be further optimized iteratively based on newly received training data.

As illustrated in FIG. 3, respective extraction modules may be used for processing respective objects. For example, the text object 210 may be inputted into the text feature extraction module 312 for extracting a text feature 322, the image object 220 may be inputted into the image feature extraction module 314 for extracting an image feature 324, and the audio object 230 may be inputted into the audio feature extraction module 316 for extracting an audio feature 326. Although the multimedia data 240 as illustrated in FIG. 3 comprises three medium types, other multimedia data may comprise more or less medium types. For example, the multimedia data 240 may comprise only the text type and the image type.

Further, the text feature 322, the image feature 324 and the audio feature 326 may be used for generating the multimedia feature 320. In implementations of the present disclosure, the above three features may be concatenated for generating the multimedia feature 320. Alternatively and/or in addition to, an attention module 318 may be provided for estimating respective weights for the respective medium types, and then the weighted features may be concatenated for generating the multimedia feature 320. Here, the attention module 318 may also be implemented by a pre-trained machine learning model.

With these implementations, various medium objects may be considered in the multimedia feature 320, and thus the multimedia feature 320 may fully reflect various aspects of the multimedia data 240 and then may represent the multimedia data 240 in an accurate and effective way. Further, based on the accurate multimedia feature 320, the multimedia data 240 may be processed in a more accurate way. For example, the multimedia data that accurately attracts the user's attention may be recommended to the user.

In implementations of the present disclosure, the first and second medium types may be selected in various ways. For example, the first medium type may be selected randomly, and another medium type other than the first medium type may be selected as the second medium type. Alternatively and/or in addition to, the medium type that provides more information may be selected as the first medium type. For example, if the text object 210 comprises a large number of words while the image object 220 comprises only a simple pattern, then the text type may be selected as the first medium type. Once the first and second medium types are determined, features may be determined for the first and second medium types, respectively. Specifically, a first feature is determined for the first medium type by a masking operation, while a second feature is directly determined for the second medium type.

Figure 4A:
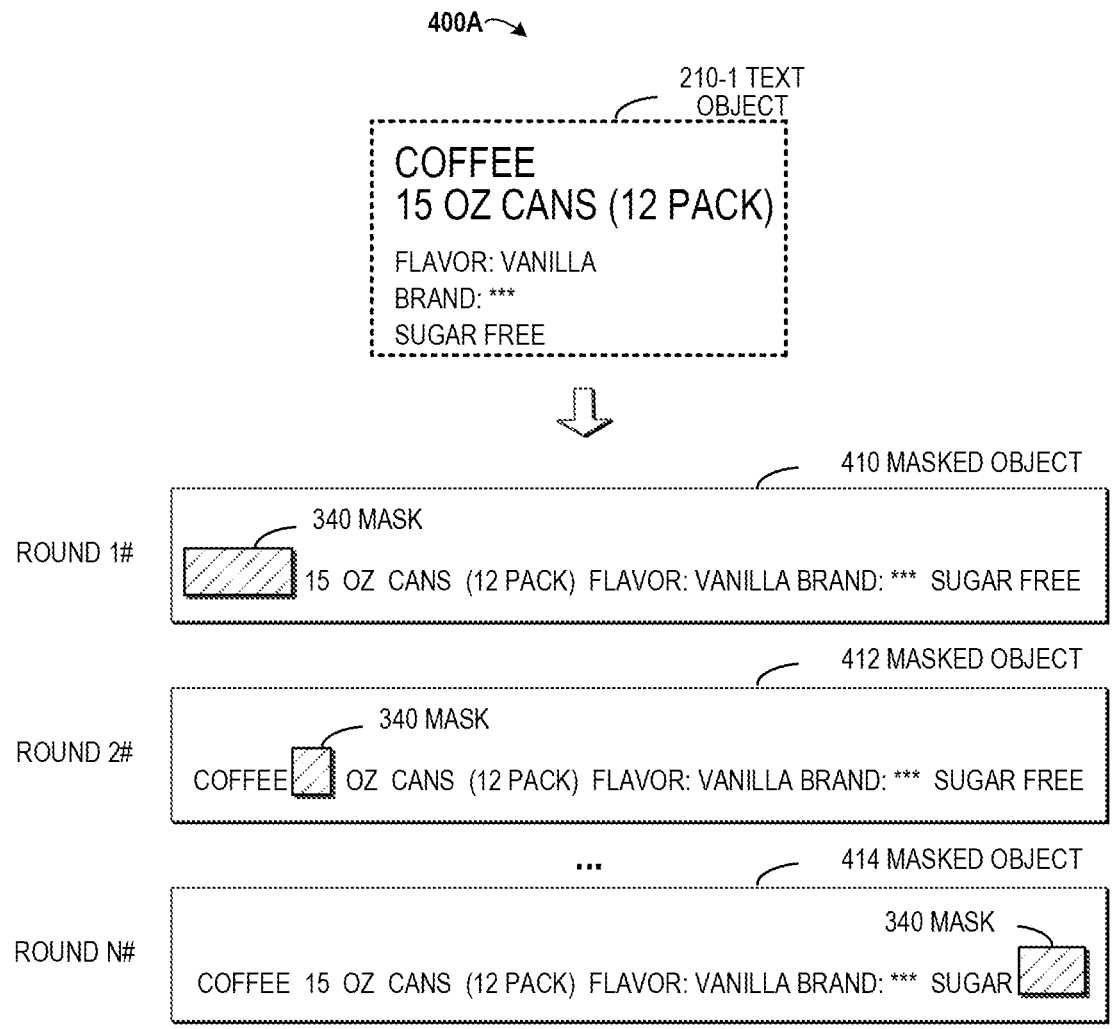
FIG. 4A illustrates an example diagram for processing a text object that is comprised in the multimedia data according to implementations of the present disclosure.

Hereinafter, reference will be made to FIG. 4A for more details about the masking operation. FIG. 4 illustrates an example diagram 400A for processing the text object 210-1 that is comprised in the multimedia data 240 according to implementations of the present disclosure. As illustrated in FIG. 4A, the text type may be selected as the first medium type and then the text object 210-1 may be parsed and words may be masked in one or more rounds. In some implementations, the number of the rounds may be determined based on the number of words comprised in the text object. As illustrated, in round 1 #, the first word "coffee" in the text object 210-1 may be masked and replaced with a predefined token (such as "@@" or another string). In some implementations, the length of the token may be decided based on a length of the masked word. Alternatively and/or in addition to, the token may be set to a predefined length. At this point, the masked object 410 excluding the masked word may be inputted into the text feature extraction module 312, and then the text feature extraction module 312 may output an intermediate feature for the masked object 410. In implementations of the present disclosure, the mask 340 may move along the text object 210-1 like a sliding window to cover the second word "15."

In round 2 #, the second word "15" may be masked and replaced with the predefined token, and then the masked object 412 excluding the masked word may be inputted into the text feature extraction module 312. At this point, another intermediate feature may be outputted for the masked object 412. Details of the all the rounds may be similar and in the last round N #, a further intermediate feature may be outputted for the masked object 414. Next, the text feature 322 may be generated based on all the above intermediate features. For example, an operation such as a weighted summation, an average, and so on may be implemented on these intermediate features to generate the text feature 322. With these implementations, the masking operation may be facilitated in detecting a deep relationship between words in the text object and extracted multimedia feature 320. Therefore, the accuracy and performance level for the feature extraction may be increased.

Figure 4B:
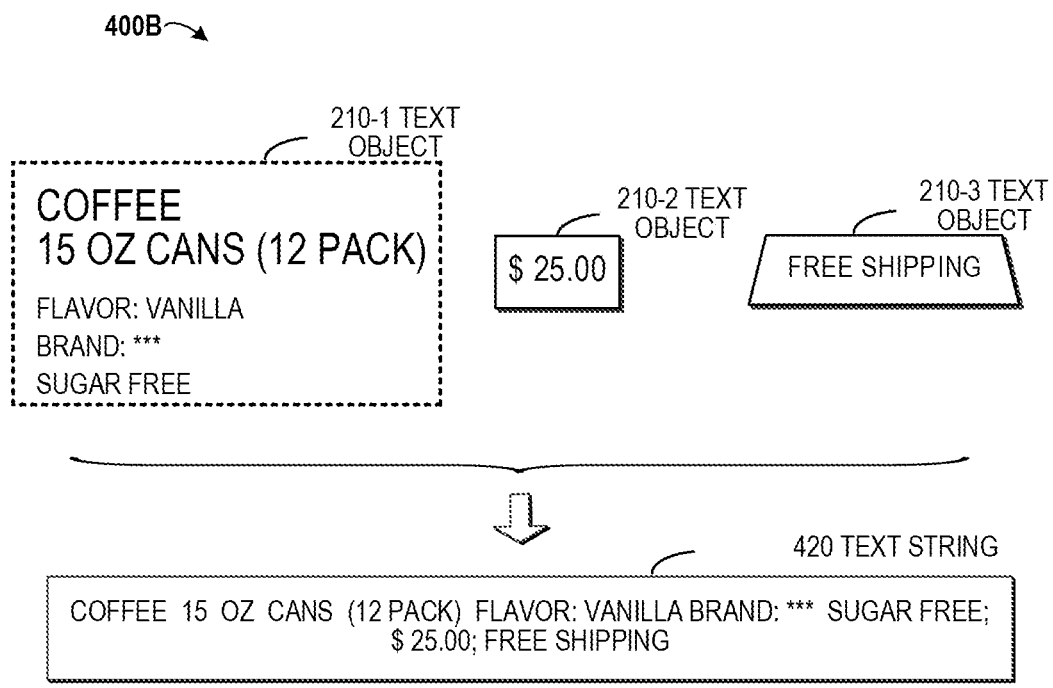
FIG. 4B illustrates an example diagram for processing multiple text objects that are comprised in the multimedia data according to implementations of the present disclosure.

In implementations of the present disclosure, if the multimedia data 240 comprises multiple text objects, then the multiple text objects may be concatenated to form a text string. FIG. 4B illustrates an example diagram 400B for processing multiple text objects that are comprised in the multimedia data according to implementations of the present disclosure. As illustrated in FIG. 4B, a text string 410 may be generated from the text objects 210-1, 210-2, and 210-3. In some implementations, texts in the above text objects may be concatenated to generate the text string 410, and texts in different text objects may be separated by a predetermined separator (such as ";" or another character). Further, words in the text string 420 may be processed in the same way as illustrated in FIG. 4A to generate the text feature 322 for all the text object 210. With implementations of the present disclosure, the text feature may be generated in an accurate way by masking respective words in respective rounds.

In some implementations of the present disclosure, the text feature extraction module 312 may be built with a pre-trained machine learning model. For example, the Bidirectional Encoder Representation from Transformer (BERT) model or another language model with predefined parameters may work as the text feature extraction module 312. Further, implementations of the present disclosure allow to optimize the BERT model with a further training dataset. For example, the predefined parameters in the BERT model may be optimized during the extraction procedure, such that the optimized BERT model may describe the association relationship in a more accurate way. Specifically, new multimedia data may be inputted and then a corresponding feature may be extracted by the extraction model 310. Further, when the feedback to the new multimedia data is received, the new multimedia data and the feedback may work as the new training data for optimizing the text feature extraction module 312. With implementations of the present disclosure, modules in the extraction model 310 may be optimized in a continuous way.

Referring back to FIG. 3 for more details about generating the second feature for the second medium type. In FIG. 3, once the text type is selected as the first medium type, one or more from the image type and the audio type may be taken as the second medium type. Compared with the conventional solution for extracting the feature from only one medium type, implementations of the present disclosure may consider contributions of more medium types, and thus the multimedia feature 320 may fully reflect contributions from the various medium types in the multimedia data 240.

Supposing the image type is selected as the second medium type, the image object 220 may be directly inputted into the image feature extraction module 314. In some implementations of the present disclosure, the image feature extraction module 314 may be implemented based on a pre-trained machine learning model. For example, the Residual Network (ResNet) model or another image processing model with predefined parameters may work as the image feature extraction module 314. Once the image feature extraction module 314 is obtained, it may output the image feature 324 for the image object 220. At this point, the multimedia feature 320 may be generated based on the first and second features (i.e., the text feature 322 and the image feature 324). Further, the present disclosure allows to further optimize the ResNet model in an iterative way. For example, the predefined parameters in the ResNet model may be optimized such that the optimized ResNet model may describe the association relationship between the image feature and the image object in a more accurate way.

In implementations of the present disclosure, the second medium type may comprise the audio type, and then the audio object 230 may be directly inputted into the audio feature extraction module 316. In some implementations of the present disclosure, the audio feature extraction module 316 may be implemented based on a pre-trained machine learning model. For example, the Mel-Frequency Cepstral Coefficient (MFCC) model or another audio processing model with predefined parameters may work as the audio feature extraction module 316. Once the audio feature extraction module 316 is obtained, it may output an audio feature 326 for the inputted image object 220. Here, the multimedia feature 320 may be generated based on the text feature 322 and the audio feature 326. Further, the present disclosure allows to further optimize the MFCC model in an iterative way. For example, the predefined parameters in the MFCC model may be optimized such that the optimized MFCC model may describe the association relationship between the audio feature and the audio object in a more precise way.

In some implementations of the present disclosure, the second medium type may comprise more than one medium type (such as both of the image type and the audio type). At this point, the multimedia feature 320 may be generated based on the text feature 322, the image feature 324 and the audio feature 326. Based on the above, all the medium types are used in generating the multimedia feature 320, and the accuracy and performance level may further be increased.

Figure 5A:
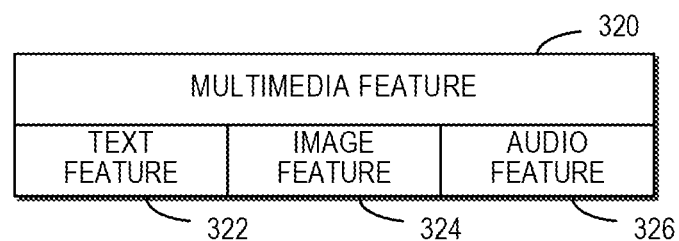
FIG. 5A illustrates an example diagram for generating a multimedia feature based on multiple features according to implementations of the present disclosure.
Figure 5B:
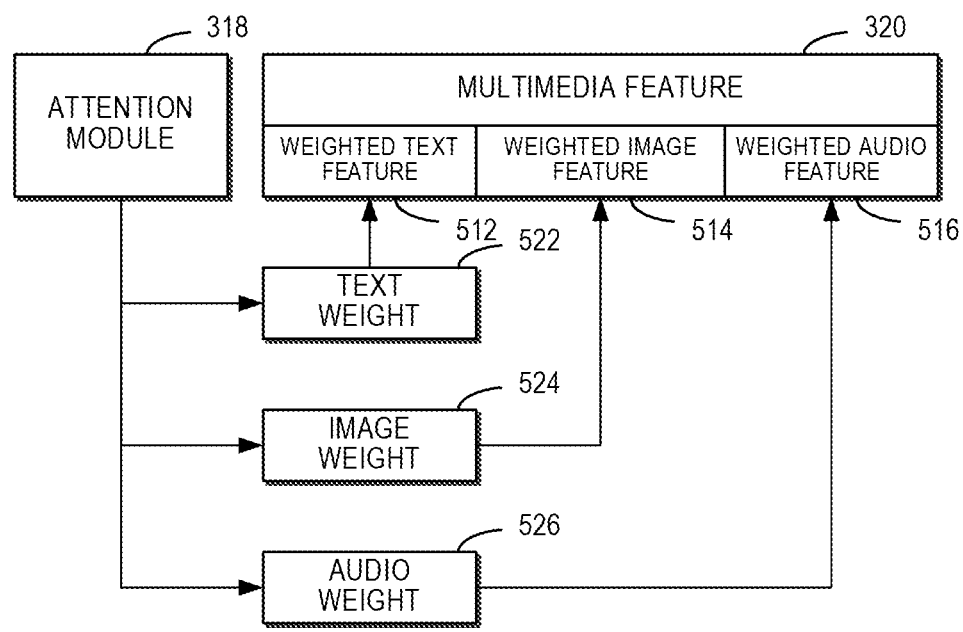
FIG. 5B illustrates an example diagram for generating a multimedia feature based on multiple weighted features according to implementations of the present disclosure.

Having described details about extracting the text feature 322, the image feature 324 and the audio feature 326, reference will be made to FIGS. 5A and 5B for generating the multimedia feature 320 for the multimedia data 240. FIG. 5A illustrates an example diagram 500A for generating a multimedia feature based on multiple features according to implementations of the present disclosure. As illustrated in FIG. 5A, the multimedia feature 320 may be determined based on a concatenation of the text feature 322, the image feature 324 and the audio feature 326. Here, the text feature 322, the image feature 324 and the audio feature 326 may have the same or different dimensions. For example, the text feature 322 may be represented by a vector of 128 dimensions (or a different format) and the image feature 324 and the audio feature 326 may be represented by a vector of 512 dimensions (or a different format).

With implementations of the present disclosure, all the above three medium types are used in determining the multimedia feature 320. Compared with the conventional solutions for extracting the feature from a single medium type, these implementations may fully take advantage of each and every medium type comprised in the multimedia data 240. Therefore, the feature extraction may be performed effectively.

Usually, contributions from the multiple medium types are not always the same, and then features for the multiple medium types may be weighted in determining the multimedia feature 320. FIG. 5B illustrates an example diagram 500B for generating a multimedia feature based on multiple weighted features according to implementations of the present disclosure. As illustrated in FIG. 5B, the attention module 318 may be provided for determining respective weights for the multiple medium types. Here, the attention module 318 may be implemented based on a pre-trained model that describes an association relationship between a feature for a medium type and a weight for the feature. For example, the attention module 318 may be trained based on a group of training data, where each training data comprises historical multimedia date that was displayed to a user and feedback from the user.

The attention module 318 may output respective weights for respective medium types: a text weight 522 for the text type, an image weight 524 for the image type, and an audio weight 526 for the audio type. Further, the text features 322, the image feature 324 and the audio feature 326 may be weighted to determine the weighted text feature 512, the weighted image feature 514, and the weighted audio feature 516, respectively. At this point, the multimedia feature 320 may be generated based on a concatenation of the weighted text feature 512, the weighted image feature 514, and the weighted audio feature 516. With implementations of the present disclosure, the contribution level of each medium type is considered and then the accuracy and performance level of the feature extraction may further be increased.

Further, implementations of the present disclosure allow to optimize the attention module 318 with a further training dataset. For example, the predefined parameters in the attention module 318 may be optimized during the extraction procedure, such that the optimized attention module 318 may describe the association relationship in a more accurate way. Specifically, new multimedia data may be inputted, and then corresponding weights may be extracted by the attention model 318. Further, when the feedback to the new multimedia data is received, the new multimedia data and the feedback may work as the new training data for optimizing the attention model 318. With implementations of the present disclosure, modules in the extraction model 310 may be optimized in a continuous way.

Figure 6A:
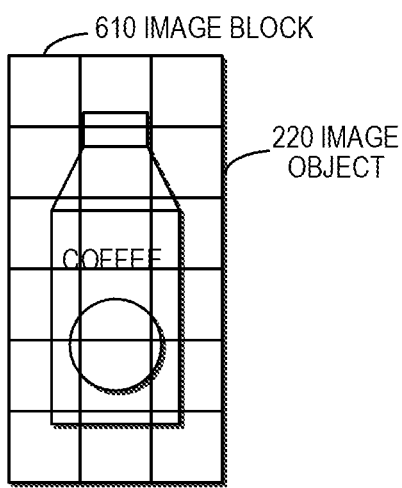
FIG. 6A illustrates an example diagram for image partition based on a slide window according to implementations of the present disclosure.

The preceding paragraphs have described details about the feature extraction when the text type is selected as the first medium type. In implementations of the present disclosure, any of the image type and the audio type may be selected as the first medium type. Hereinafter, reference will be made to FIGS. 6A-6B and FIG. 7 for more information about generating an image feature by the masking operation. FIG. 6A illustrates an example diagram 600A for image partition based on a slide window according to implementations of the present disclosure. In FIG. 6A, the image type is selected as the first medium type and then the image object 220 may be divided into multiple image blocks in the masking operation. For example, the image block may have a predefined size of 16*16 pixels (or another size). In another example, the size of the image block may be determined based on a complexity level of the image object 220. If the image object 220 comprises a complex pattern, the image block may have a larger size such as 32*32 pixels. If the image object 220 comprises a simple pattern, the image block may have a smaller size such as 16*16 pixels.

As illustrated in FIG. 6A, a mask that covers an image block may move in the image object 220. The image object 220 may be processed in several rounds, and the mask may move to a next image block in each round. Specifically, the mask may cover the first image block in the image object 220 in round 1 #. At this point, the first image block may be replaced with a predefined image block (such as a white image block, or an image block with another color). Further, the masked image object without the first image block may be inputted into the image feature extraction module 314, and then an intermedia feature may be outputted for the masked image object. In round 2 #, the mask may slide to the second image block and then a corresponding intermedia feature may be generated for the masked image object without the second image block. The mask may slide in the image object 220 until it reaches the last image block, and then a corresponding intermedia feature may be generated for the masked image object without the last image block. Further, all these intermedia features may be used for generating the image feature 324 in a similar way as described for generating the text feature 322. With these implementations, the masking operation may be facilitated in detecting a deep relationship between image blocks in the image object and the multimedia feature 320. Therefore, the accuracy and performance level for the feature extraction may be increased.

Further, implementations of the present disclosure allow to optimize the image feature extraction module 314 with a further training dataset. For example, parameters in the module may be optimized during the extraction procedure, such that the optimized module may describe the association relationship in a more accurate way. Specifically, new multimedia data may be inputted and then a corresponding feature may be extracted by the extraction model 310. Further, when the feedback to the new multimedia data is received, the new multimedia data and the feedback may work as the new training data for optimizing the image feature extraction module 314. With implementations of the present disclosure, modules in the extraction model 310 may be optimized in a continuous way.

Figure 6B:
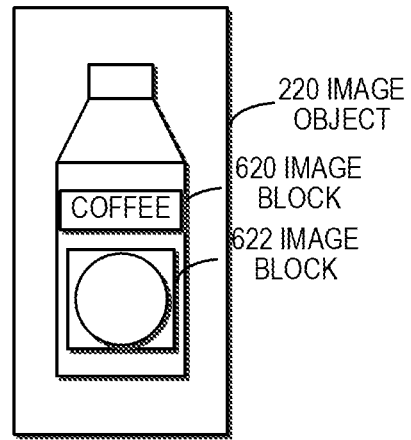
FIG. 6B illustrates an example diagram for image partition based on the content recognition according to implementations of the present disclosure.

In some implementations of the present disclosure, the content of the image object 220 may be recognized for identifying a potential area of interest in the image object 220. FIG. 6B illustrates an example diagram 600B for image partition based on the content recognition according to implementations of the present disclosure. As illustrated in FIG. 6B, an image block 620 that covers a name of the drink is recognized based on the content recognition. Further, another image block 622 that covers a logo of the drink is recognized. Based on a similar procedure, another image block such as the background may be recognized from the image object 220. Different from the image blocks that are obtained based on the slide window, the image blocks derived from the content recognition may have different sizes, and thus masks with different sizes may be used for masking these image blocks 620 and 622, respectively. Further, depending on the number of image blocks that are recognized from the image object 220, one or more rounds of the masking operation may be implemented for generating the image feature 324. Alternatively and/or in addition to, the procedures as illustrated in FIGS. 6A and 6B may be combined for generating the image feature 324.

Figure 7:
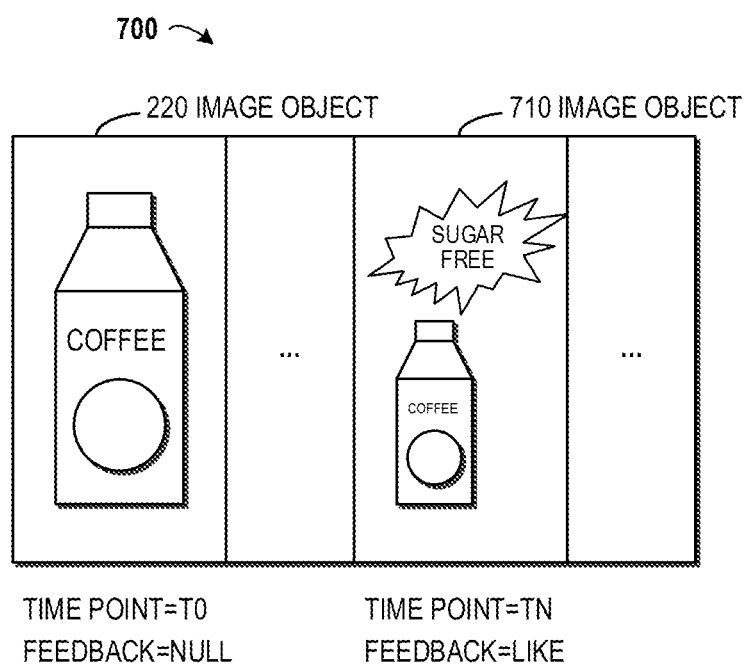
FIG. 7 illustrates an example diagram for processing an image sequence comprised in the multimedia data according to implementations of the present disclosure.

In some implementations of the present disclosure, the multimedia data 240 may comprise an image sequence (such as a video) and thus individual images may be extracted from the image sequence during the feature extraction. FIG. 7 illustrates an example diagram 700 for processing an image sequence comprised in the multimedia data 240 according to implementations of the present disclosure. As illustrated in FIG. 7, the multimedia data 240 may comprise the image objects 220, . . . , 710 at different time points T0, . . . , Tn, respectively. Each image object may be extracted and then go through the procedures as illustrated in FIG. 6A and/or FIG. 6B for generating the image feature.

It is to be understood that when the multimedia data 240 comprises an image sequence that covers a time period, user feedbacks may be provided at different time points. In other words, the user may provide the positive/negative feedback when a noticeable image is displayed during the time period. In FIG. 7, the image object 220 may be displayed at the time point T0, and the user may continue to watch and provide no feedback. As the playback continues, more and more image objects are displayed, the user may click the "like" button when he/she sees the slogan "sugar free" at the time point Tn. In this situation, the image object 710 triggers the user feedback, and thus the feature extraction may consider different time points during the playback of the multimedia data 240. With these implementations, the feature may be extracted in a more precise way when the time factor is considered.

Further, the present disclosure allows to further optimize the image feature extraction module 314 in an iterative way. For example, during the extraction phase, if an image object triggers the "like/dislike" feedback at a specific time point Ti, the image object and the feedback at the time point Ti may be used as the training data for optimizing the image feature extraction module 314. With these implementations, the image feature extraction module 314 may be continuously optimized iteratively and thus provide a more accurate image feature.

Figure 8:
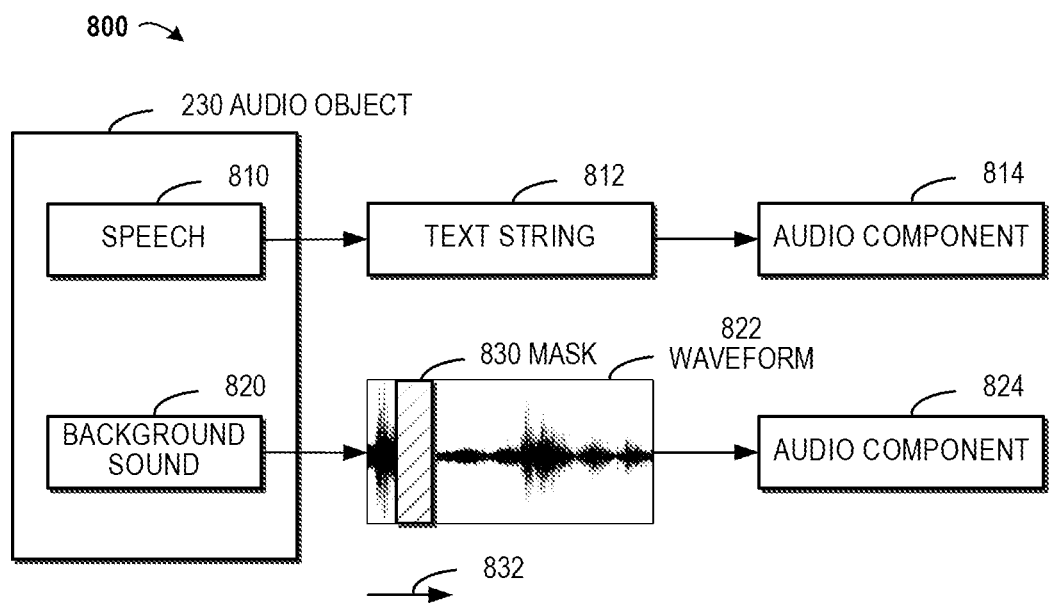
FIG. 8 illustrates an example diagram for processing an audio object that is comprised in a multimedia data according to implementations of the present disclosure.

In implementations of the present disclosure, the audio type may be selected as the first medium type, and reference will be made to FIG. 8 for details about the feature extraction for the audio object 230. FIG. 8 illustrates an example diagram 800 for processing the audio object 230 that is comprised in the multimedia data 240 according to implementations of the present disclosure. Usually, the audio object 230 may comprise various types of contents. For example, there may be a speech for introducing the coffee as well as a background music, and thus these contents may go through different procedures. As illustrated in FIG. 8, a content analysis may be implemented on the audio object 230, such that the speech 810 and the background sound 820 may be identified from the audio object 230. With implementations of the present disclosure, various types of contents may be identified and then go through corresponding extraction procedures. Therefore, more aspects may be considered in extracting the audio feature 326, such that the multimedia feature 320 may fully reflect the multimedia data 240 in a more precise way.

Once the content is determined, the speech 810 may be processed based on the Automatic Speech Recognition (ASR) technique for obtaining a corresponding text string 812. Then, the text string 812 may also considered as a text object and words in the text string 812 may be masked in one or more rounds for the feature extraction. At this point, an audio component 814 may be extracted from the speech 810. With respect to the background sound 820, a waveform 822 may be determined for the background 820 and then the waveform 822 may be divided into multiple fragments according to a predefined window size (such as 500 ms or another duration). Further, a mask 830 may slide along the waveform 822 (in a direction 832) to mask a corresponding fragment in each round. The masked waveform may be inputted into the audio feature extraction module 316 to extract an intermedia audio feature in each round. After several rounds of processing, an audio component 824 may be extracted from the background sound 820. With these implementations, the masking operation may be facilitated in detecting a deep relationship between fragments in the audio object and extracted multimedia feature 320. Therefore, the accuracy and performance level for the feature extraction may be increased.

Further, implementations of the present disclosure allow to optimize audio feature extraction module 316 with a further training dataset. For example, the predefined parameters in the module may be optimized during the extraction procedure, such that the optimized module may describe the association relationship in a more accurate way. Specifically, new multimedia data may be inputted and then a corresponding feature may be extracted by the extraction model 310. Further, when the feedback to the new multimedia data is received, the new multimedia data and the feedback may work as the new training data for optimizing the audio feature extraction module 316. With implementations of the present disclosure, modules in the extraction model 310 may be optimized in a continuous way.

In implementations of the present disclosure, the above two audio components 814 and 824 may be used to generate the audio feature 326. Sometimes, if the audio object 230 comprises only one content type, then the obtained audio component may be directly used as the audio feature 326. With implementations of the present disclosure, all the contents in the audio object 230 are considered in the feature extraction, and then the accuracy and performance level of the feature extraction may be increased.

Having described details about individual steps of the feature extraction, the following paragraphs will provide an example procedure for extracting a multimedia feature from a target multimedia data by using the well-trained extraction model 310. In implementations of the present disclosure, the above extraction procedure may be implemented several times by selecting different medium types as the first medium type.

Figure 9A:
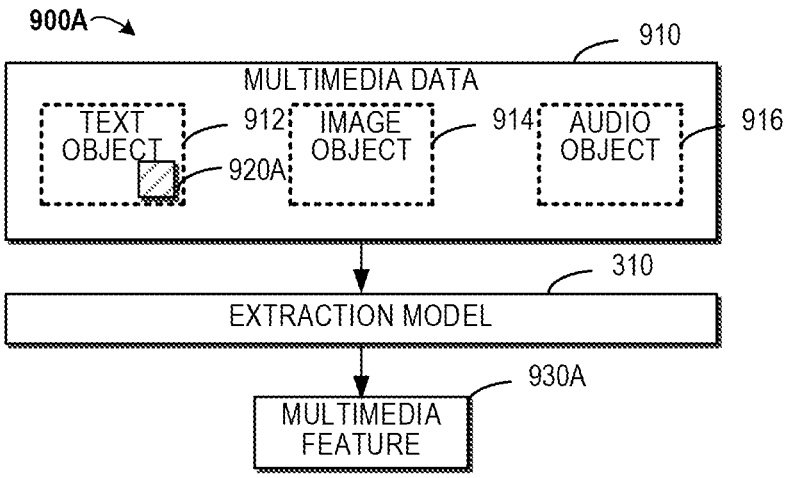
FIGS. 9A-9C illustrate example diagrams for respective steps in the feature extraction according to implementations of the present disclosure.
Figure 9B:
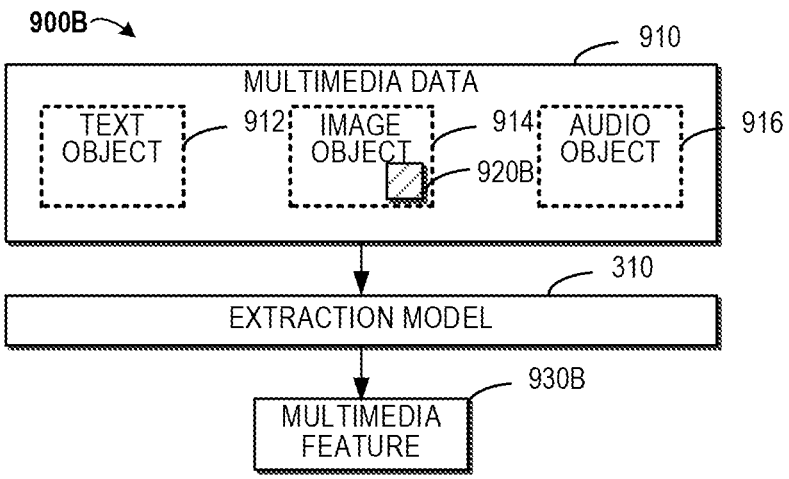
Figure 9C:
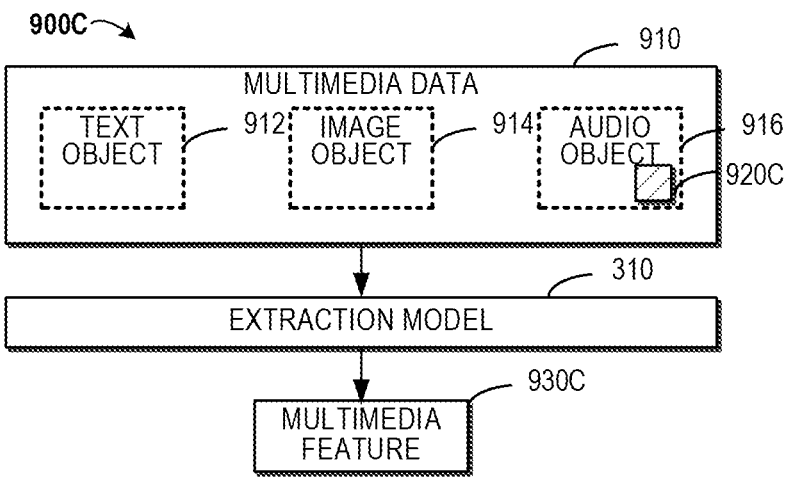

Referring to FIGS. 9A-9C for multiple steps in the feature extraction, here FIGS. 9A-9C illustrate example diagrams 900A-900C for respective steps for extracting a multimedia feature according to implementations of the present disclosure. Referring to FIG. 9A, the multimedia data 910 comprises a text object 912, an image object 914 and an audio object 916. Here, the feature extraction may comprise three steps, where a single medium may be selected as the first medium type in each step. In each step, a corresponding feature may be generated for the selected first medium type, and then the multiple features generated in the multiple steps may be used for determining a final multimedia feature for the multimedia data 910.

As illustrated in FIG. 9A, the text medium type may be selected as the first medium type and thus a mask 920A may be applied to the text object 912. Based on the extraction procedure as described in the above paragraphs, a multimedia feature 930A may be obtained from the extraction model 310. Similarly, in FIG. 9B, the text medium type may be selected as the first medium type and a mask 920B may be applied to the image object 914. Then, a multimedia feature 930B may be obtained from the extraction model 310. In FIG. 9C, the audio medium type may be selected as the first medium type and a mask 920C may be applied to the audio object 916. Then, a multimedia feature 930C may be obtained from the extraction model 310. Further, the final multimedia feature may be generated based on the multimedia features 930A, 930B and 930C. With implementations of the present disclosure, each step may be based on a single medium type, and then the final multimedia feature may include full contributions from each and every medium type.

Although implementations of the present disclosure are described in the recommendation environment, implementations may be used in other environments. For example, in a classification environment, features may be extracted from the multimedia data and then the multimedia data may be classified into various clusters such as sports, travel, entertainment and so on.

The above paragraphs have described details for the feature extraction. According to implementations of the present disclosure, a method is provided for extracting a feature for multimedia data. Reference will be made to FIG.

Figure 10:
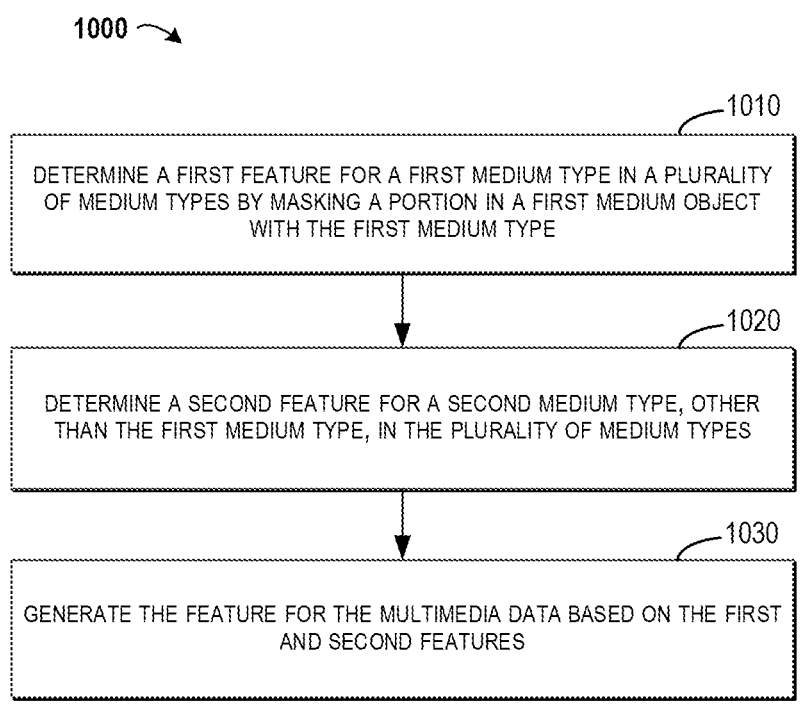
FIG. 10 illustrates an example flowchart of a method for extracting a feature from the multimedia data according to implementations of the present disclosure.

10 for more details about the method, where FIG. 10 illustrates an example flowchart of a method 1000 for extracting a feature for multimedia data according to implementations of the present disclosure. Here, the multimedia data comprises a plurality of medium types. At a block 1010, a first feature is determined for a first medium type in the plurality of medium types by masking a portion in a first medium object with the first medium type. At a block 1020, a second feature is determined for a second medium type, other than the first medium type, in the plurality of medium types. At a block 1030, the feature is generated for the multimedia data based on the first and second features.

In implementations of the present disclosure, in order to determine the first feature, the portion is selected from the first medium object, and the first feature is generated based on an extraction module and the masked first medium object, the extraction module describing an association relationship between a feature and a medium object with the first medium type.

In implementations of the present disclosure, in order to select the portion from the first medium object, in response to a determination that the first medium type is a text type, a word is selected from the first medium object based on a sliding window.

In implementations of the present disclosure, in order to select the portion from the first medium object, in response to a determination that the first medium type is an image type, an image block is selected from the first medium object based on any of a window that slides in the first medium object; and an image area that is recognized in the first medium object.

In implementations of the present disclosure, the first medium object is extracted from an image sequence that is comprised in the multimedia data.

In implementations of the present disclosure, in order to select the portion from the first medium object, in response to a determination that the first medium type is an audio type, a content of the first medium object is determined by a content analysis to the first medium object, and then the portion is selected from the first medium object based on the content.

In implementations of the present disclosure, in order to select the portion from the first medium object, in response to a determination that the first medium type comprises a speech, the speech is converted into a text object, and then a word is selected in the text object.

In implementations of the present disclosure, in order to select the portion from the first medium object, in response to a determination that the first medium type comprises a background audio, a fragment is selected in a waveform of the background audio.

In implementations of the present disclosure, in order to generate the feature for the multimedia data, a first weight is determined for the first feature and a second weight is determined for the second feature based on an attention module and the first and second features, respectively. The attention module describes an association relationship between respective features for respective medium types and respective weights for the respective features. Further, the feature is generated based on the first and second weights and the first and second features.

In implementations of the present disclosure, a third feature is determined for a third medium type, other than the first and second medium types, in the plurality of medium types, and the feature is generated for the multimedia data based on the third features.

In implementations of the present disclosure, a fourth feature is determined for a fourth medium type in the plurality of medium types by masking a portion in a fourth medium object with the fourth medium type. A fifth feature is determined for a fifth medium type, other than the fourth medium type, in the plurality of medium types. The feature is generated for the multimedia data based on the fourth and fifth features.

According to implementations of the present disclosure, an apparatus is provided for extracting a feature for multimedia data that comprises a plurality of medium types. The apparatus comprises: a first determining unit, configured for determining a first feature for a first medium type in the plurality of medium types by masking a portion in a first medium object with the first medium type; a second determining unit, configured for determining a second feature for a second medium type, other than the first medium type, in the plurality of medium types; and a generating unit, configured for generating the feature for the multimedia data based on the first and second features. Further, the apparatus may comprise other units for implementing other steps in the method 1000.

According to implementations of the present disclosure, an electronic device is provided for implementing the method 1000. The electronic device comprises: a computer processor coupled to a computer-readable memory unit, the memory unit comprising instructions that when executed by the computer processor implements a method for extracting a feature for multimedia data that comprises a plurality of medium types. The method comprises: determining a first feature for a first medium type in the plurality of medium types by masking a portion in a first medium object with the first medium type; determining a second feature for a second medium type, other than the first medium type, in the plurality of medium types; and generating the feature for the multimedia data based on the first and second features.

In implementations of the present disclosure, determining the first feature comprises: selecting the portion from the first medium object; and generating the first feature based on an extraction module and the masked first medium object, the extraction module describing an association relationship between a feature and a medium object with the first medium type.

In implementations of the present disclosure, selecting the portion from the first medium object comprises: in response to a determination that the first medium type is a text type, selecting a word from the first medium object based on a sliding window.

In implementations of the present disclosure, selecting the portion from the first medium object comprises: in response to a determination that the first medium type is an image type, selecting an image block from the first medium object based on any of a window that slides in the first medium object; and an image area that is recognized in the first medium object.

In implementations of the present disclosure, the first medium object is extracted from an image sequence that is comprised in the multimedia data.

In implementations of the present disclosure, selecting the portion from the first medium object comprises: in response to a determination that the first medium type is an audio type, determining a content of the first medium object by a content analysis to the first medium object; and selecting the portion from the first medium object based on the content.

In implementations of the present disclosure, selecting the portion from the first medium object based on the content comprises any of in response to a determination that the first medium type comprises a speech, converting the first medium object into a text object; and selecting a word in the text object; in response to a determination that the first medium type comprises a background audio, selecting a fragment in a waveform of the first medium object.

In implementations of the present disclosure, generating the feature for the multimedia data comprises: determining a first weight for the first feature and a second weight for the second feature based on an attention module and the first and second features, respectively, the attention module describing an association relationship between respective features for respective medium types and respective weights for the respective features; and generating the feature based on the first and second weights and the first and second features.

In implementations of the present disclosure, the method further comprises: determining a third feature for a third medium type, other than the first and second medium types, in the plurality of medium types; and wherein generating the feature for the multimedia data further comprises: generating the feature for the multimedia data based on the third features.

In implementations of the present disclosure, the method further comprises: determining a fourth feature for a fourth medium type in the plurality of medium types by masking a portion in a fourth medium object with the fourth medium type; determining a fifth feature for a fifth medium type, other than the fourth medium type, in the plurality of medium types; and generating the feature for the multimedia data further comprises: generating the feature for the multimedia data based on the fourth and fifth features.

According to implementations of the present disclosure, a computer program product, the computer program product comprising a computer readable storage medium having program instructions embodied therewith, the program instructions executable by an electronic device to cause the electronic device to perform the method 1000.

Figure 11:
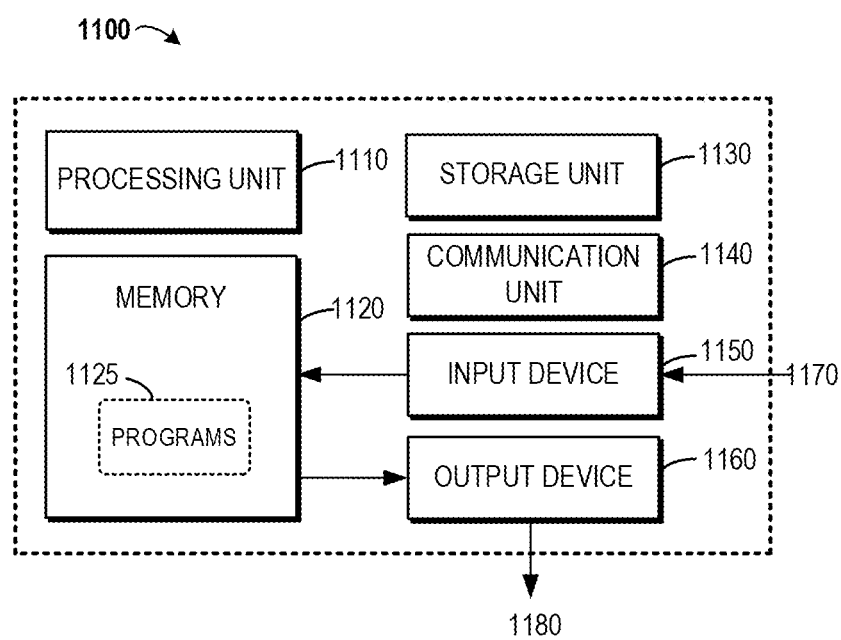
FIG. 11 illustrates a block diagram of a computing device in which various implementations of the present disclosure can be implemented.

FIG. 11 illustrates a block diagram of a computing device 1100 in which various implementations of the present disclosure can be implemented. It would be appreciated that the computing device 1100 shown in FIG. 11 is merely for purpose of illustration, without suggesting any limitation to the functions and scopes of the present disclosure in any manner. The computing device 1100 may be used to implement the above method 1000 in implementations of the present disclosure. As shown in FIG. 11, the computing device 1100 may be a general-purpose computing device. The computing device 1100 may at least comprise one or more processors or processing units 1110, a memory 1120, a storage unit 1130, one or more communication units 1140, one or more input devices 1150, and one or more output devices 1160.

The processing unit 1110 may be a physical or virtual processor and can implement various processes based on programs stored in the memory 1120. In a multi-processor system, multiple processing units execute computer executable instructions in parallel so as to improve the parallel processing capability of the computing device 1100. The processing unit 1110 may also be referred to as a central processing unit (CPU), a microprocessor, a controller, or a microcontroller.

The computing device 1100 typically includes various computer storage medium. Such medium can be any medium accessible by the computing device 1100, including, but not limited to, volatile and non-volatile medium, or detachable and non-detachable medium. The memory 1120 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage unit 1130 may be any detachable or non-detachable medium and may include a machine-readable medium such as a memory, flash memory drive, magnetic disk, or another other media, which can be used for storing information and/or data and can be accessed in the computing device 1100.

The computing device 1100 may further include additional detachable/non-detachable, volatile/non-volatile memory medium. Although not shown in FIG. 11, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 1140 communicates with a further computing device via the communication medium. In addition, the functions of the components in the computing device 1100 can be implemented by a single computing cluster or multiple computing machines that can communicate via communication connections. Therefore, the computing device 1100 can operate in a networked environment using a logical connection with one or more other servers, networked personal computers (PCs) or further general network nodes.

The input device 1150 may be one or more of a variety of input devices, such as a mouse, keyboard, tracking ball, voice-input device, and the like. The output device 1160 may be one or more of a variety of output devices, such as a display, loudspeaker, printer, and the like. By means of the communication unit 1140, the computing device 1100 can further communicate with one or more external devices (not shown) such as the storage devices and display device, with one or more devices enabling the user to interact with the computing device 1100, or any devices (such as a network card, a modem, and the like) enabling the computing device 1100 to communicate with one or more other computing devices, if required. Such communication can be performed via input/output (I/O) interfaces (not shown).

In some implementations, instead of being integrated in a single device, some or all components of the computing device 1100 may also be arranged in cloud computing architecture. In the cloud computing architecture, the components may be provided remotely and work together to implement the functionalities described in the present disclosure. In some implementations, cloud computing provides computing, software, data access and storage service, which will not require end users to be aware of the physical locations or configurations of the systems or hardware providing these services. In various implementations, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The functionalities described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out the methods of the subject matter described herein may be written in any combination of one or more programming languages. The program code may be provided to a processor or controller of a general-purpose computer, special purpose computer, or other programmable data processing apparatus such that the program code, when executed by the processor or controller, causes the functions/operations specified in the flowcharts and/or block diagrams to be implemented. The program code may be executed entirely or partly on a machine, executed as a stand-alone software package partly on the machine, partly on a remote machine, or entirely on the remote machine or server.

In the context of this disclosure, a machine-readable medium may be any tangible medium that may contain or store a program for use by or in connection with an instruction execution system, apparatus, or device. The machine-readable medium may be a machine-readable signal medium or a machine-readable storage medium. A machine-readable medium may include but not limited to an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are illustrated in a particular order, this should not be understood as requiring that such operations are performed in the particular order shown or in sequential order, or that all illustrated operations are performed to achieve the desired results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Rather, various features described in a single implementation may also be implemented in multiple implementations separately or in any suitable subcombination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

From the foregoing, it will be appreciated that specific implementations of the presently disclosed technology have been described herein for purposes of illustration, but that various modifications may be made without deviating from the scope of the disclosure. Accordingly, the presently disclosed technology is not limited except as by the appended claims.

Implementations of the subject matter and the functional operations described in the present disclosure can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media, and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the use of "or" is intended to include "and/or", unless the context clearly indicates otherwise.

While the present disclosure contains many specifics, these should not be construed as limitations on the scope of any disclosure or of what may be claimed, but rather as descriptions of features that may be specific to particular implementations of particular disclosures. Certain features that are described in the present disclosure in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are illustrated in the drawings in a particular order, this should not be understood as requiring that such operations be performed in the particular order shown or in sequential order, or that all illustrated operations be performed, to achieve desirable results. Moreover, the separation of various system components in the implementations described in the present disclosure should not be understood as requiring such separation in all implementations. Only a few implementations and examples are described, and other implementations, enhancements and variations can be made based on what is described and illustrated in the present disclosure.

What is claimed is:

1. A method of extracting a feature for multimedia data that comprises a plurality of medium types, comprising: determining a first feature for a first medium type in the plurality of medium types by masking a portion in a first medium object with the first medium type in a plurality of rounds; determining a second feature for a second medium type, other than the first medium type, in the plurality of medium types; and generating the feature for the multimedia data based on the first and second features.

2. The method of claim 1, wherein determining the first feature comprises:
   selecting the portion from the first medium object; and
   generating the first feature based on an extraction module and the masked first medium object, the extraction module describing an association relationship between a feature and a medium object with the first medium type.

3. The method of claim 2, wherein selecting the portion from the first medium object comprises:
   in response to a determination that the first medium type is a text type, selecting a word from the first medium object based on a sliding window.

4. The method of claim 2, wherein selecting the portion from the first medium object comprises: in response to a determination that the first medium type is an image type, selecting an image block from the first medium object based on any one of the following:
   a window that slides in the first medium object; and
   an image area that is recognized in the first medium object.

5. The method of claim 4, wherein the first medium object is extracted from an image sequence that is comprised in the multimedia data.

6. The method of claim 2, wherein selecting the portion from the first medium object comprises: in response to a determination that the first medium type is an audio type,
   determining a content of the first medium object by a content analysis to the first medium object; and
   selecting the portion from the first medium object based on the content.

7. The method of claim 6, wherein selecting the portion from the first medium object based on the content comprises any one of the following:
   in response to a determination that the first medium type comprises a speech, converting the speech into a text object and selecting a word in the text object; and
   in response to a determination that the first medium type comprises a background audio, selecting a fragment in a waveform of the background audio.

8. The method of claim 1, wherein generating the feature for the multimedia data comprises:
   determining a first weight for the first feature and a second weight for the second feature based on an attention module and the first and second features, respectively, the attention module describing an association relationship between respective features for respective medium types and respective weights for the respective features; and
   generating the feature based on the first and second weights and the first and second features.

9. The method of claim 1, further comprising: determining a third feature for a third medium type, other than the first and second medium types, in the plurality of medium types; and
   wherein generating the feature for the multimedia data further comprises: generating the feature for the multimedia data based on the third features.

10. The method of claim 1, further comprising:
   determining a fourth feature for a fourth medium type in the plurality of medium types by masking a portion in a fourth medium object with the fourth medium type;
   determining a fifth feature for a fifth medium type, other than the fourth medium type, in the plurality of medium types; and
   generating the feature for the multimedia data based on the fourth and fifth features.

11. An electronic device, comprising a computer processor coupled to a computer-readable memory unit, the memory unit comprising instructions that when executed by the computer processor implements a method of extracting a feature for multimedia data that comprises a plurality of medium types, comprising:
   determining a first feature for a first medium type in the plurality of medium types by masking a portion in a first medium object with the first medium type in one or more rounds;
   determining a second feature for a second medium type, other than the first medium type, in the plurality of medium types; and
   generating the feature for the multimedia data based on the first and second features.

12. The device of claim 11, wherein determining the first feature comprises:
   selecting the portion from the first medium object; and
   generating the first feature based on an extraction module and the masked first medium object, the extraction module describing an association relationship between a feature and a medium object with the first medium type.

13. The device of claim 12, wherein selecting the portion from the first medium object comprises:
   in response to a determination that the first medium type is a text type, selecting a word from the first medium object based on a sliding window.

14. The device of claim 12, wherein selecting the portion from the first medium object comprises: in response to a determination that the first medium type is an image type, selecting an image block from the first medium object based on any of:
   a window that slides in the first medium object; and
   an image area that is recognized in the first medium object.

15. The device of claim 14, wherein the first medium object is extracted from an image sequence that is comprised in the multimedia data.

16. The device of claim 12, wherein selecting the portion from the first medium object comprises: in response to a determination that the first medium type is an audio type,
   determining a content of the first medium object by a content analysis to the first medium object; and
   selecting the portion from the first medium object based on the content.

17. The device of claim 11, wherein generating the feature for the multimedia data comprises:
   determining a first weight for the first feature and a second weight for the second feature based on an attention module and the first and second features, respectively, the attention module describing an association relationship between respective features for respective medium types and respective weights for the respective features; and
   generating the feature based on the first and second weights and the first and second features.

18. The device of claim 11, wherein the method further comprises: determining a third feature for a third medium type, other than the first and second medium types, in the plurality of medium types; and
   wherein generating the feature for the multimedia data further comprises: generating the feature for the multimedia data based on the third features.

19. The device of claim 11, wherein the method further comprises:
   determining a fourth feature for a fourth medium type in the plurality of medium types by masking a portion in a fourth medium object with the fourth medium type;
   determining a fifth feature for a fifth medium type, other than the fourth medium type, in the plurality of medium types; and
   generating the feature for the multimedia data further comprises: generating the feature for the multimedia data based on the fourth and fifth features.

20. A computer program product, the computer program product comprising a non-transitory computer readable storage medium having program instructions embodied therewith, the program instructions executable by an electronic device to cause the electronic device to perform a method of extracting a feature for multimedia data that comprises a plurality of medium types, the method comprises:
   determining a first feature for a first medium type in the plurality of medium types by masking a portion in a first medium object with the first medium type in one or more rounds;
   determining a second feature for a second medium type, other than the first medium type, in the plurality of medium types; and
   generating the feature for the multimedia data based on the first and second features.

* * * * *